UNITED STATES PATENT OFFICE.

KONRAD DELBRÜCK, OF ELBERFELD, GERMANY, ASSIGNOR TO SYNTHETIC PATENTS CO., INC., OF NEW YORK, N. Y., A CORPORATION OF NEW YORK.

FOOD FOR CATTLE.

1,169,322.  Specification of Letters Patent.  Patented Jan. 25, 1916.

No Drawing.  Application filed November 5, 1914. Serial No. 870,527.

*To all whom it may concern:*

Be it known that I, KONRAD DELBRÜCK, doctor of philosophy, chemist, citizen of the German Empire, residing at Elberfeld, Germany, have invented new and useful Improvements in Food for Cattle, of which the following is a specification.

The present invention relates to the manufacture of a useful cattle food (fodder) which is obtained by fermenting carbohydrates by means of the *Bacillus macerans*, removing the products of fermentation and drying, if necessary, the residuary liquors. It can also be used in a fresh or liquid state. The *Bacillus macerans* has been described by Schardinger in *Centralbl. f. Bakt.* II Abt. 14, 772 (1905).

In order to illustrate the new process more fully the following example is given, the parts being by weight:—1000 parts of maize are mixed up with 10000 parts of water and 20 parts of chalk. The mixture is inoculated with a bacilli culture of the *Bacillus macerans*. After the fermentation is complete the alcohol and acetone produced are distilled over and the residue, commonly known as distiller's mash, is dried over hot rolls and pressed into cakes. This residue contains albuminous substances, unchanged starch and dextrin, and inorganic nutritive salts. When corn (maize) is used, the mass will also contain cellulose. It can be used as food for cattle, dogs and poultry, etc.

Instead of maize, potatoes, rye, oats, etc., can be used.

I claim:—

A new food for cattle comprising a residue obtainable by distilling a carbohydrate mixture which has been fermented by means of the *Bacillus macerans*, said residue containing albuminous substances, unchanged starch and inorganic nutritive salts.

In testimony whereof I have hereunto set my hand in the presence of two subscribing witnesses.

KONRAD DELBRÜCK. [L. S.]

Witnesses:
HELEN NUFER,
ALBERT NUFER.